(12) United States Patent
Lewis et al.

(10) Patent No.: US 8,358,929 B2
(45) Date of Patent: Jan. 22, 2013

(54) NETWORK PROTECTION SWITCHING MECHANISMS AND METHODS OF NETWORK PROTECTION

(75) Inventors: David Owen Lewis, Warwickshire (GB); Richard Andrew Jensen, Lexington, MA (US)

(73) Assignee: Polatis Limited, Cambridge (GB)

( * ) Notice: Subject to any disclaimer, the term of this patent is extended or adjusted under 35 U.S.C. 154(b) by 674 days.

(21) Appl. No.: 12/301,208

(22) PCT Filed: Jun. 1, 2007

(86) PCT No.: PCT/US2007/013067
§ 371 (c)(1),
(2), (4) Date: Jun. 10, 2009

(87) PCT Pub. No.: WO2007/143169
PCT Pub. Date: Dec. 13, 2007

(65) Prior Publication Data
US 2010/0027989 A1 Feb. 4, 2010

Related U.S. Application Data

(60) Provisional application No. 60/876,348, filed on Dec. 20, 2006.

(30) Foreign Application Priority Data

Jun. 1, 2006 (GB) .................................. 0610819.5

(51) Int. Cl.
*H04B 10/08* (2006.01)

(52) U.S. Cl. ...................... 398/19; 398/12; 398/2; 398/5
(58) Field of Classification Search .................. 398/4, 5, 398/12, 19, 7, 3, 2
See application file for complete search history.

(56) References Cited

U.S. PATENT DOCUMENTS

| | | | |
|---|---|---|---|
| 6,721,502 B1 * | 4/2004 | Al-Salameh et al. ............. | 398/3 |
| 2003/0170020 A1 | 9/2003 | Chaudhuri et al. | |
| 2005/0201749 A1 * | 9/2005 | Wang et al. ...................... | 398/12 |
| 2006/0002704 A1 * | 1/2006 | Jasti ................................ | 398/12 |

FOREIGN PATENT DOCUMENTS

| | | |
|---|---|---|
| WO | WO 01/50176 A1 | 7/2001 |
| WO | WO 02/46825 A1 | 6/2002 |
| WO | WO 2004/113980 A1 | 12/2004 |

* cited by examiner

*Primary Examiner* — M. R. Sedighian
(74) *Attorney, Agent, or Firm* — Workman Nydegger (57) ABSTRACT

A network protection switching mechanism comprises a plurality of optical switches located at a plurality of nodes; a plurality of optical communication paths between said switches; switch based fault detectors located as part of at least two switches which generate detection results representative of the identification of a fault; switch based controllers located as part of said at least two switches; and internal switch-communication means between said fault detectors and said controllers which facilitate the transmission of detection results from said fault detectors to said controllers; wherein said controllers directly cause switching to an alternative optical communication path dependent upon the receipt of said detection results; whereby autonomous switch based protection without dependence on either inter-switch control communication or higher level network control communication is achieved.

17 Claims, 5 Drawing Sheets

Figure 4

NETWORK PROTECTION SWITCHING MECHANISMS AND METHODS OF NETWORK PROTECTION

FIELD OF THE INVENTION

The invention relates to network protection switching mechanisms and methods of network protection.

BACKGROUND OF THE INVENTION

Fiber cuts, equipment faults and degradations cause a significant number of disruptions and outages. As businesses and consumers become increasingly intolerant of network failures, downtime can be very expensive to carriers due to both lost revenue and tarnished images. As a result, carriers continually search for better ways to protect networks against such fiber faults and reduce costs by more efficient use of protection bandwidth.

Existing protection switching systems usually involves higher level communications or signaling between nodes in the network using complex framed overhead channels or packet communications.

Designing networks that are automatically protected against multiple worst-case fiber breaks can be difficult and expensive. As a result, many network protection schemes typically only provide automatic protection against single fiber faults. The reasoning behind this is that a repair crew will be dispatched immediately after a single fault and hopefully fix the problem before another fault occurs. Many of the overall transport line and network availability calculations are dominated by the probability of second fault occurring before the first fault is repaired.

Major disasters, like earthquakes and hurricanes, can often cause multiple fiber breaks in a network. While no system can protect against every contingency, having a network that can automatically reconfigure and recover from multiple fiber faults will greatly improve overall availability.

SUMMARY OF THE INVENTION

In a first broad independent aspect, the invention provides a network protection switching mechanism comprising a plurality of optical switches located at a plurality of nodes; a plurality of optical communication paths between said switches;
switch based fault detectors located as part of at least two switches which generate detection results representative of the identification of a fault;
switch based controllers located as part of said at least two switches; and
internal switch communication means between said fault detectors and said controllers which facilitate the transmission of detection results from said fault detectors to said controllers; wherein said controllers directly cause switching to an alternative optical communication path dependent upon the receipt of said detection results; whereby autonomous switch based protection without dependence on either inter-switch control communication or higher level network control communication is achieved.

This is particularly advantageous because it allows fiber fault detection and control of the switching hardware at both transmitting and receiving ends without intervention. This mechanism may also be operated independently from the number of node hops between transmitting and receiving network nodes.

In a subsidiary aspect, the mechanism is configured to share a multiplicity of protection paths without the need for communication between nodes or intervention from a higher level network control layer.

In a further subsidiary aspect, said mechanism operates in a switch of the kind described in any of the following applications: WO0246825, WO0150176, and WO2004113980.

In a further aspect, the invention provides an optical fiber switching assembly, comprising:
(a) a first set of optical components incorporating a number of optical guides spaced from a second set of optical components incorporating a number of optical guides;
(b) collimating means corresponding to each optical guide;
(c) actuating means which flex when actuated and are operatively connected to said collimating means for individually moving said collimating means; and
(d) means for controlling the actuating means so that optical radiation is transmitted from a selected guide in the first set and received by a selected guide in the second set; and a mechanism in accordance with the first broad independent aspect.

This configuration is particularly advantageous because it synergistically improves the rapidity of network fault handling. It allows fault correction to be handle entirely locally i.e. without the requirement for communication between the nodes or intervention of higher level network control layers.

In a further subsidiary aspect, the mechanism allows the control to be carried out entirely locally within the switching hardware at each node of a network.

In a further subsidiary aspect, the fault is detected independently by the switching hardware in the transmitting and receiving network nodes without physical layer signals being sent from a first switch to a second switch in the network.

In a further subsidiary aspect in accordance with the invention's first broad independent aspect, said controller is configured to identify available paths to act as alternative optical communication paths; and said controller is configured to directly instruct switching to an identified available path in response to the receipt of said fault results.

This configuration is particularly advantageous because this avoids the exact protection path having to be predetermined before a fiber fault occurs.

In a further subsidiary aspect, the mechanism further comprises a plurality of protection paths; and at least one further fault detector corresponding to at least one protection path; wherein said controller is configured to directly instruct switching to a further protection path in response to the receipt of a fault result from said at least one fault detector.

This configuration is particularly advantageous because it facilitates protection against multiple network failures since the protection paths may also be monitored after they are provisioned and the traffic automatically switched to another protection path in a pool of paths if a subsequent fiber failure occurs in the protection path. This consequently further increases overall network reliability and availability.

In a further subsidiary aspect, said controller is configured to switch to a further protection path in a pre-determined order.

In a further subsidiary aspect, said faults detectors detect optical power of an optical signal at optical switches coupled via optical communication paths.

In a further subsidiary aspect, said mechanism incorporates a detector at a transmission node which detects a fault by the characteristic reflection produced by fiber cuts and breaks.

In a further subsidiary aspect, said mechanism incorporates a detector at a receiving node which detects a fault by the characteristic of the loss of signal.

In a further subsidiary aspect, said mechanism is configured to select the next available fiber path out of each node path based on a predetermined hierarchy.

In a further subsidiary aspect, said mechanism comprises means for relaying information pertaining to the state of protection switching to the higher level network control plans.

In a further subsidiary aspect, said mechanism comprises means for downloading protection switching criteria from higher level network control layers.

In a second broad independent aspect, the invention provides a method of network protection comprising the steps of: detecting faults in optical signals at least two optical switches coupled via optical communication paths;
generating detection results representative of the identification of a fault;
communicating said detection results internally within said switches to the respective switch based controller; and
directly causing switching to an alternative optical communication path dependent upon the receipt of said detection results; whereby autonomous switch based protection without dependence on either inter-switch control communication or higher level network control communication is achieved.

In a subsidiary aspect in accordance with the invention's second broad independent aspect, the method further comprises the step of identifying available paths to act as alternative optical communication paths; and causing said controller to directly instruct switching to an identified available path in response to the receipt of said fault results.

In a further subsidiary aspect, the method further comprises the step of detecting faults on at least one protection path and directly instructing switching to a further protection path in response to the receipt of a fault result from said detection.

In a further subsidiary aspect, said detection is a detection of optical power of an optical signal at optical switches coupled via optical communication paths.

DETAILED DESCRIPTION OF THE INVENTION

Embodiments of this invention increase the speed of fault detection and network protection switching by having intelligent optical switches with optical power detectors that can locally detect faults in the optical line. The switching controller operates without the switching being a result from switch to switch physical layer optical communication and without complicated overhead framing as required by prior art systems. Embodiments can also improve fiber utilization by allowing working lines to share a pool of protection paths.

The "shared pool" concept can be extended to the difficult task of protecting a network against multiple fiber breaks by simply monitoring through detectors such as optical power detectors the protection paths in the same way as the working paths after they are provisioned. This allows the traffic-carrying protection paths to be protected by the remaining resources of the shared pool. If the network experiences a second fiber break on either a provisioned protection path or regular working line, the traffic is automatically switched to another protection path from the pool. The "shared pool" concept can also enhance network availability by providing protection against multiple fiber faults.

The number of faults the network can tolerate is determined by the size of the spare fiber pool.

Embodiments of the invention can be used to replace or supplement existing protection-switching methods in traditional systems like SONET (synchronous optical networking) and/or SDH (synchronous digital hierarchy). The integration of the mechanism to such systems requires no fundamental revision of the systems which renders the system particularly advantageous due to its adaptability.

In practice, an embodiment can be integrated into existing systems as an enhancement for handling fiber faults. For example, the optical switch interfaces with the higher-level network control planes through a standard communication channel.

In the event of a fiber break, a switch automatically reconfigures around the fault according to predefined rules and then informs the higher-level control plane via an upstream interface. Conversely, the higher-level control planes can command the switch to reconfigure in the event of non-fiber faults or to turn off the automatic protection switching feature for maintenance operations. Embodiments of the invention allow the working traffic lines to share efficiently several protection paths without either the need for intervention from a higher-level network control layer or the need for inter-switch control communication.

An embodiment of the invention includes two optical switches at the ends of a communications' path with optical detectors to protect against network faults that result in changes in detected optical power such as a reduction, loss of optical power or a power level representative of a reflection without the need for intervention of higher-level network control planes, complex signaling or any inter-switch control communication.

Figure 1:
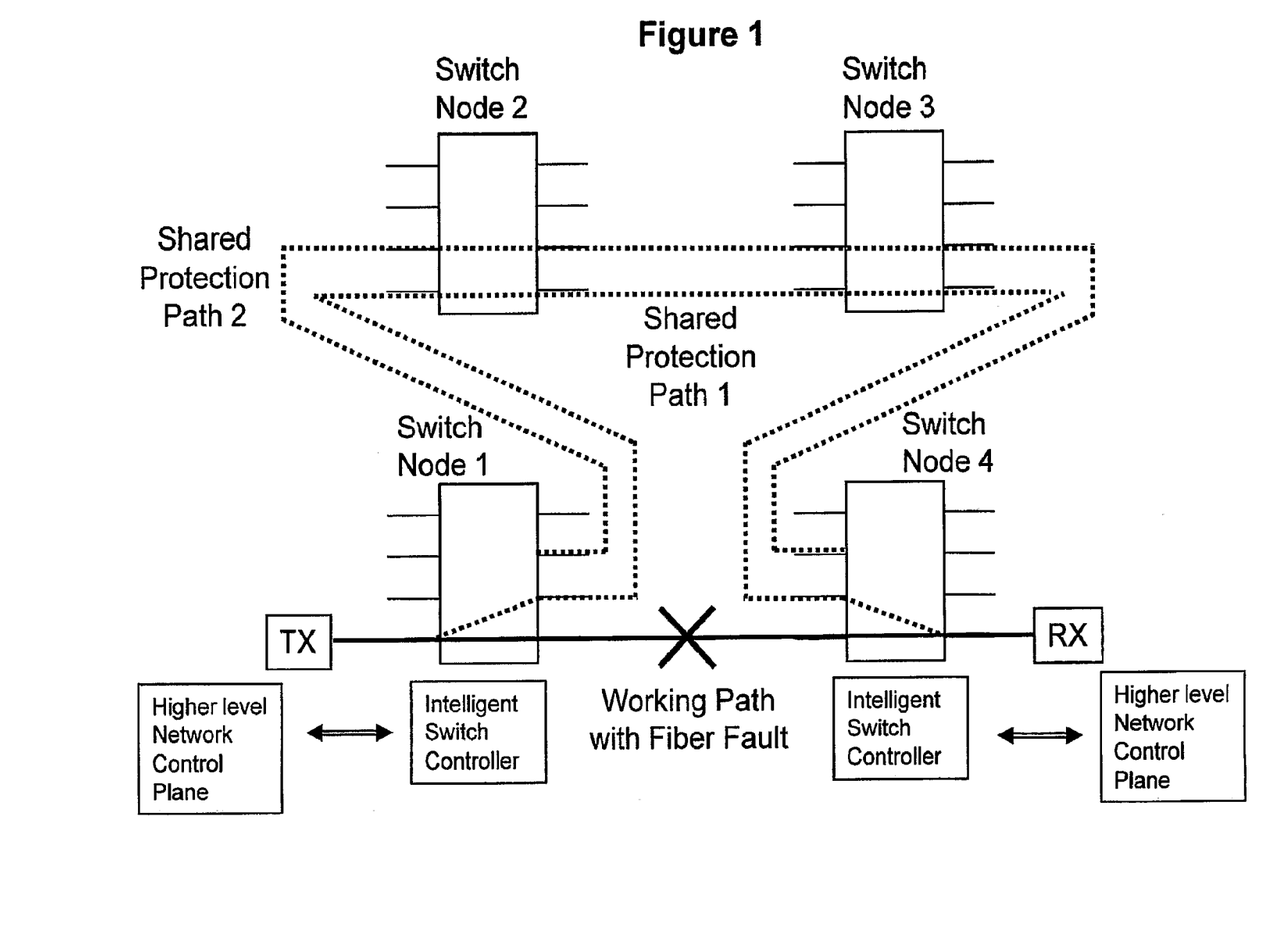
FIG. 1 shows an overview of a fast distributed automatic network optical fibre protection switch and mechanism using combined local fibre fault detection and switching control.

FIG. 1 shows a network optical fiber projection switching mechanism using combined local fiber fault detection and switching control. Switch node 1 incorporates a transmitter (Tx) whilst switch node 4 incorporates a receiver (Rx).

In the switch of node 1 at least one optical power detector is located at the output port corresponding to the working path. The detector is configured to detect power corresponding to reflection resulting from a fiber fault such as a break in the fiber in the working path between the switch of node 1 and the switch of node 4.

The switch of node 4 incorporates at least one optical power detector at an input port of the switch corresponding to the working path. This optical power detector is configured to detect a loss of power in the working path due to a break in the path. A communication line is provided between the optical power detectors in the respective switch nodes and their respective intelligent switch controller.

The intelligent switch controller responds to the detection of reflection in the output port of the switch of node 1 to cause switching to an available protection path such as shared protection path 1 which is shared by the switches of nodes 1, 2, 3 and 4. Substantially simultaneously, the optical detector in the input port of the switch of node 4 transmits a loss of power signal to the intelligent switch controller of switch node 4 which will cause the switching to an available protection path such as protection path 1. Protection path 1 passes through switch node 2 and switch node 3 before arriving at switch node 4.

Since the local switching hardware controls node connections to both the working and protection fibers for all the paths connected to the switch, the switching hardware can select from a multiplicity of pre-determined protection paths in a pool of available paths. The exact protection fiber used for a particular working fiber failure does not need to be pre-determined. In other words, it can be any of the available protection paths provided in a pool.

The method of how to select the next available protection path can be determined by a variety of means. For example, one simple method would be to pre-provision protection paths and then pre-determine the order they will be assigned to mitigate network faults. This allows multiple workings paths connected to the switch to additionally share a common pool of protection fibers and paths.

The method can be applied to the difficult task of protection against multiple network failures since the protection paths can also be monitored after they are provisioned and the traffic automatically switched to another protection path in the pool if a subsequent fiber failure occurs in the protection path. This feature can greatly enhance overall network reliability and availability.

The method can be extended to the switching of line pairs or grouping of fibers based on single or multiple fiber faults.

Summary of FIG. 1 fault detection and protection switch steps when a fiber fault occurs on the working path between the switch of node 1 and the switch of node 4:

A) For the switch of node 1:
- The signals transmitted from the transmitter (TX) are reflected at a break on the working path;
- In the switch of node 1 at the output port corresponding to the working path, the fault is detected due to the detection of a power level typically associated with reflection;
- Communication of a fault signal from the detector to the intelligent switch controller of the switch of node 1;
- Intelligent switch controller switches the input port of the switch of node 1 to an alternative output port corresponding to an available shared protection path; and
- Controller waits a predetermined amount of time for the switch of node 1 and the switch of node 4 to finish switching; and
- Controller reports the change in status to the higher level network control plane.

B) For the switch of node 4:
- The signals transmitted from the transmitter (TX) fail to reach the input port (which corresponds to the working path) of the switch of node 4;
- Loss of power detected in the switch of node 4 at the corresponding input port;
- Communication of a fault signal from the detector to the intelligent switch controller of the switch of node 4;
- Intelligent switch controller switches the output port of the switch of node 4 to an input port corresponding to an available protection path;
- Controller waits a predetermined amount of time for the switch of node 1 and the switch of node 4 to finish switching; and
- Controller reports the change in status to the higher level network control plane.

The Intelligent controllers of the switch of node 1 and the switch of node 4 respectively orchestrate switching from working path to shared protection path 1 having checked that these communication paths are available as protection paths. This configuration allows local detection of faults in each switch followed by local corrective action. The switches operate independently to detect faults and initiate protection switching. The intelligent switch controller initiates switching directly without inter-switch control communication. It may employ and install pre-defined rules for the switching and the communications' interface to communicate to external higher level network components.

Example embodiments of the invention enable efficient use of protection fiber paths because the local switching control allows multiple working paths to share a pool of protection paths. The exact protection path for each working path does not need to be defined before a fiber fault occurs. Because the optical switches know which protection paths are in use at any time, they simply select the next available protection path and then report the network reconfiguration to the higher network control layers. These higher layers can download updated protection switching criteria at any time.

An example method of how to select the next available protection path can be determined by a variety of means. For example, one simple method would be to pre-provision dark fiber protection paths and predetermine the order in which they are to be assigned to mitigate faults. This scheme enables multiple working paths connected to the switch to efficiently share a common pool of protection fibers and paths.

Two desirable optical switch characteristics for this application are low loss and fast switching times. The low loss minimizes the impact on the transmission line impairment budget; the fast switch time ensures the switching is completed before higher-level control plane layers intervene. A synergetic effect is achieved when using a switch of the kind provided by Polatis Limited or Polatis Photonics Incorporated and the protection mechanism described herein.

The protection switching is independent of the number of intermediate switches of node hops. In the case where many optical switches are included in the path only the switches at the end of the path are needed to perform a protection switch.

Figure 2:
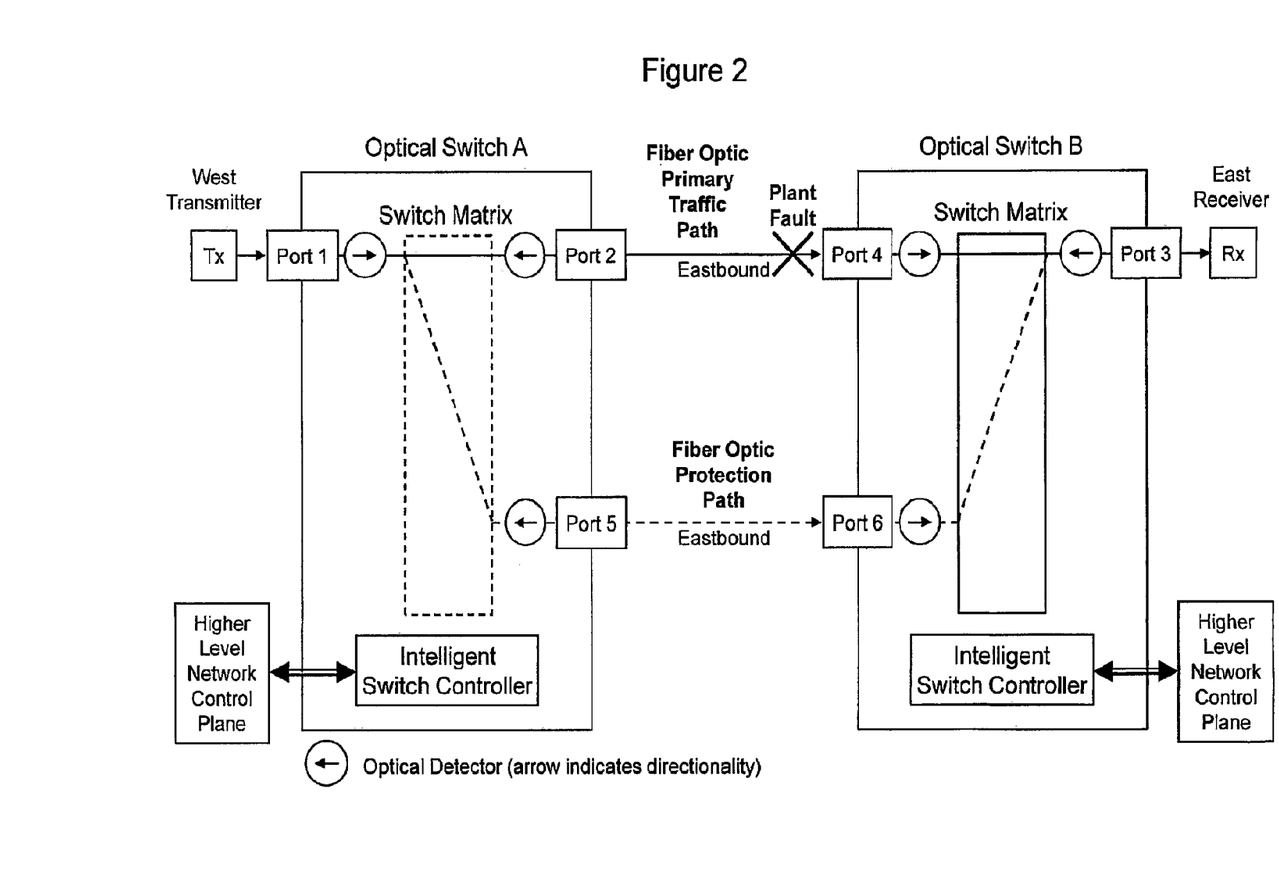
FIG. 2 shows a network protection mechanism as envisaged in FIG. 1 with the detail embodiment of two switches A and B with power detectors.

In FIG. 2, two optical switches A and B are shown with each switch including ports, optical detectors, a switch matrix and an intelligent optical switch controller. The ports define the fiber connection points to the switch. The optical detectors have directionality where they detect the optical power in the direction of the arrow. A West transmitter (Tx) inputs a signal to optical switch A at port 1 which is provided with a detector. The signal is received at port 2 which also comprises a detector. A fiber optic primary traffic path extends Eastbound between port 2 of switch A and port 4 of switch B. Switch B also incorporates an input port 4 with a detector and an output port 3 with a detector in the path leading to the East receiver (Rx). Both optical switch A and optical switch B incorporate an intelligent switch controller which is in communication with the detectors through appropriate communication lines and with the higher level network control plane. When a fault occurs in the Eastbound primary traffic path the following fault detection and protection switch steps take place:

A) In switch A:
- The signals transmitted from the West transmitter (TX) are reflected at a break on the fiber optic primary traffic path;
- At the output port 2 corresponding to the fiber optic primary traffic path, the fault is detected by the detector of port 2 due to the detection of a power level typically associated with reflection;
- Internal communication of a fault signal from the detector to the intelligent switch controller of the switch;

Intelligent switch controller switches the input port 1 to an alternative output port 5 corresponding to an available fiber optic protection path; and Controller waits a predetermined amount of time for switch A and switch B to finish switching; and Controller reports the change in status to the higher level network control plane.

B) In switch B:

The signals transmitted from the West transmitter (TX) fail to reach the input port 4 (which corresponds to the traffic path);

Loss of power detected by the detector of port 4;

Communication of a fault signal from the detector to the intelligent switch controller of the switch;

Intelligent switch controller switches the output port 3 of the switch to input port 6 corresponding to an available protection path;

Controller waits a predetermined amount of time for switch A and switch B to finish switching; and Controller reports the change in status to the higher level network control plane.

A detector is located at port 5 (switch A) which would detect any reflection caused by a break in the optical protection path. A further detector is also provided at port 6 (switch B) to detect loss of power due to a break on the protection path.

In this embodiment, optical switch A includes a further optical power detector located at port 1 which detects any loss of power from the transmitter. This power detection is optional. Since the switching operation may be controlled by the inclusion of only one power detector at port 2 of optical switch A and only one power detector located in optical switch B at port 4.

Another optional power detector is located at port 3 of switch B which detects reflection from a fault between port 3 and the East receiver.

The switch matrices are fully non-blocking switch matrices. A symmetric N×N or asymmetric N×M switch matrix could be used. The intelligent switch controllers coordinate the reading of optical power within the switch, the switching function, the storage of the predefined rules for the switching and the communications' interface to communicate to external higher level network components. The predefined protection paths can be downloaded or changed at any time via the communications' interface and the switch can report all protection configurations changes, switch setting and diagnostics via the same channel. The switch can be configured to manually or automatically respond to network faults. The intelligent switch controllers operate autonomously in each switch in terms of identifying a loss of optical power and cause the respective switch matrices to switch optical signals from a working path to a protection path.

There are many criteria that could be used to detect faults. One criterion could be an absolute reference level where a predetermined power level is selected and fault is declared when the power drops below a predetermined level. Another criterion could be a relative reference level where a predetermined power drop is selected and a fault is declared when the power drops by the predetermined amount. Many other techniques could be used, such as delaying the declaration of a fault until the level or change in power threshold has been exceeded for a predetermined amount of time or comparing optical powers over time.

The integrity of the protection switch can be checked by monitoring the power at port 6 and port 5 on both switches A and B. Both Switch A and Switch B wait a pre-determined amount of time for both switches to complete the protection switch. If power is not detected on the protection input port 6 of switch B or if a reflection is detected at port 5 of switch A after the period, then the protection switch was not successfully completed and each switch sets a protection switch error flag for this protection switch. The protection switch event and status can be sent via the communications' channel to the higher network layers.

The switch could also have a pre-programmed list of actions in the event of the protection switch errors. Finally, the intelligent switch controllers in protection switches A and B then report the results to the higher level network control plane. The switches would include the change of status of the network connections, the optical power readings the protection switch error flags, other switch status flags and any other pertinent information.

Since switch A also has an input power detector that is monitoring the power of the transmitter (TX) the switch can determine if the local (TX) laser has failed and inform the higher level network control plane so an appropriate equipment repair or higher level network protect switch can be made. In this embodiment, the input power detector on switch A port 1 can detect if the source laser in the transmitter (TX) has failed. The optical switches could also be programmed to automatically switch to backup transponders when a transmitter (TX) failure is identified. Again, that switch would inform the higher level network control layers of the configuration change.

This mechanism is fast because the detection of fiber faults and protection switching control are done locally within the switching hardware at each node without requiring inter-switch communication or higher level network control communication.

Figure 3:
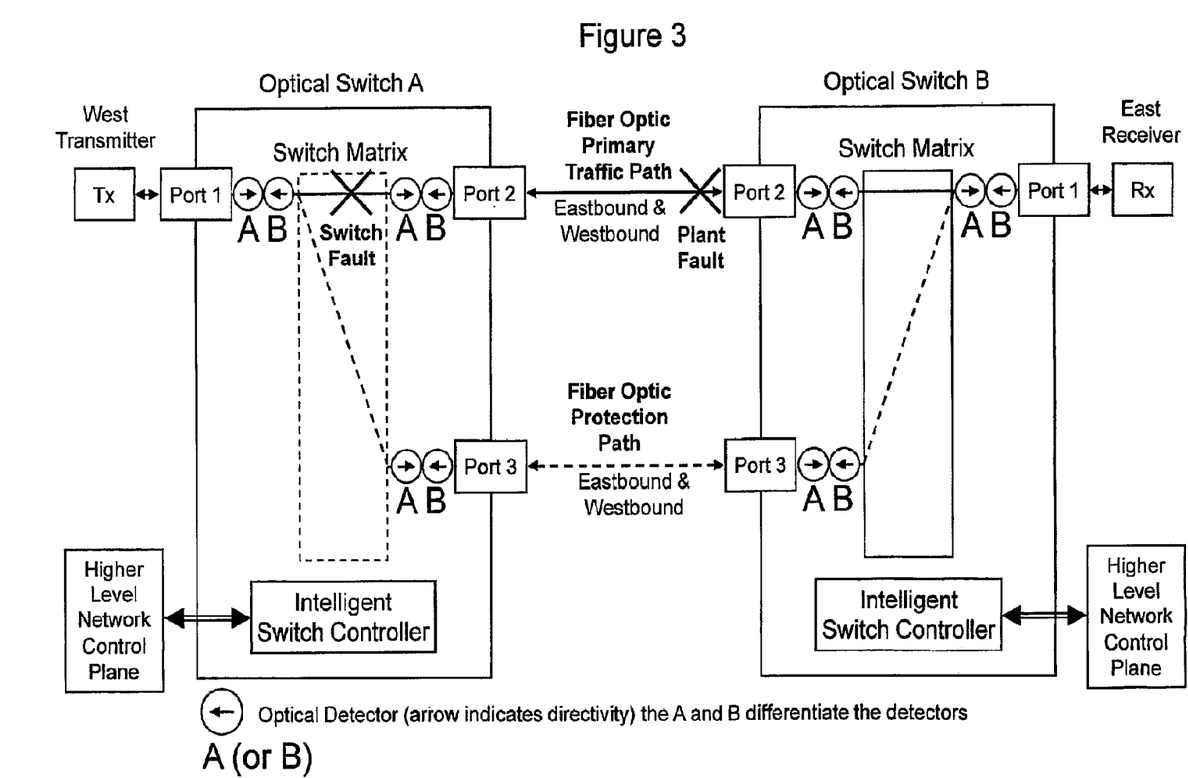
FIG. 3 shows a network protection mechanism in overview using switches with two power detectors per switch port.

FIG. 3 shows a network protection mechanism using switches with two power detectors per switch port.

A West transmitter transmits an optical signal to port 1 of optical switch A. Two optical power detectors A and B are provided at port 1 with opposite directivity. The fiber optic primary path port 1 is in communication with port 2 which also has two optical detectors A and B. The fiber optic primary traffic path extends between port 2 of switch A and port 2 of switch B. Port 2 of switch B incorporates two optical detectors A and B. Port 2 of optical switch B is in communication in its primary configuration with port 1 of switch B where two optical power detectors A and B are located. The detector pairs incorporate a detector in the eastbound direction and a detector in the westbound direction.

In response to a detection of a fault, the optical switches cause the traffic to be diverted to port 3 instead of port 2 respectively. Ports 3 of each switch are in communication through a fiber optic protection path.

In a first mode of use when a plant fault occurs on an eastbound traffic path a reflection is detected by detector B of port 2 in switch A whilst a loss of power is detected in switch B at port 2 by detector A.

A communication line is provided between detector B of port 2 and an intelligent switch controller of switch A allowing switch A to switch from traffic to protection path by directing the signals of port 1 to port 3.

Simultaneously, detector A of port 2 of switch B detects a loss of power and communicates this to the intelligent switch controller which causes the signals to be re-directed between port 3 and port 1 of switch B.

The intelligent switch controllers are configured to wait a pre-determined amount of time for switch A and B to finish switching.

Once the signal is re-directed from port 1 to port 3 in optical switch A, detector A of port 3 detects power signifying that the switch operation has been completed. If power is detected by detector B of port 3 and a loss of power is detected by detector A in port 3, a further break would exist between port 3 of switch A and port 3 of switch B in the fiber optic protection path. In these circumstances, the intelligent switch controller would select the next available path until no such fault is detected.

In a second mode of use a switch fault arises between port 1 and port 2 which would cause a loss of power to be detected by detector A of switch A (port 2) and a reflection to be detected by detector B of switch A port 1. In these circumstances, the intelligent switch controller would also switch the signals from port 1 to be re-directed to port 3.

In a preferred practical mode of operation, when a switch fault arises between port 1 and port 2 the intelligent controller compares the power at port 1 detector A and port 2 detector A in order to identify the switch fault. The detector A of port 1 would see the power of the transmitter while port 2 detector A would read no power or a reduced power (or some loss of power greater than expected in normal switch operation).

As previously described any change in the switch configuration is communicated by the intelligent switch controller to the higher level network control plane. If a loss of power is detected at port 1 detector A of switch A, a fault in the West transmitter would be flagged with potentially the corrective course of action as described above with reference to FIG. 2.

Figure 4:
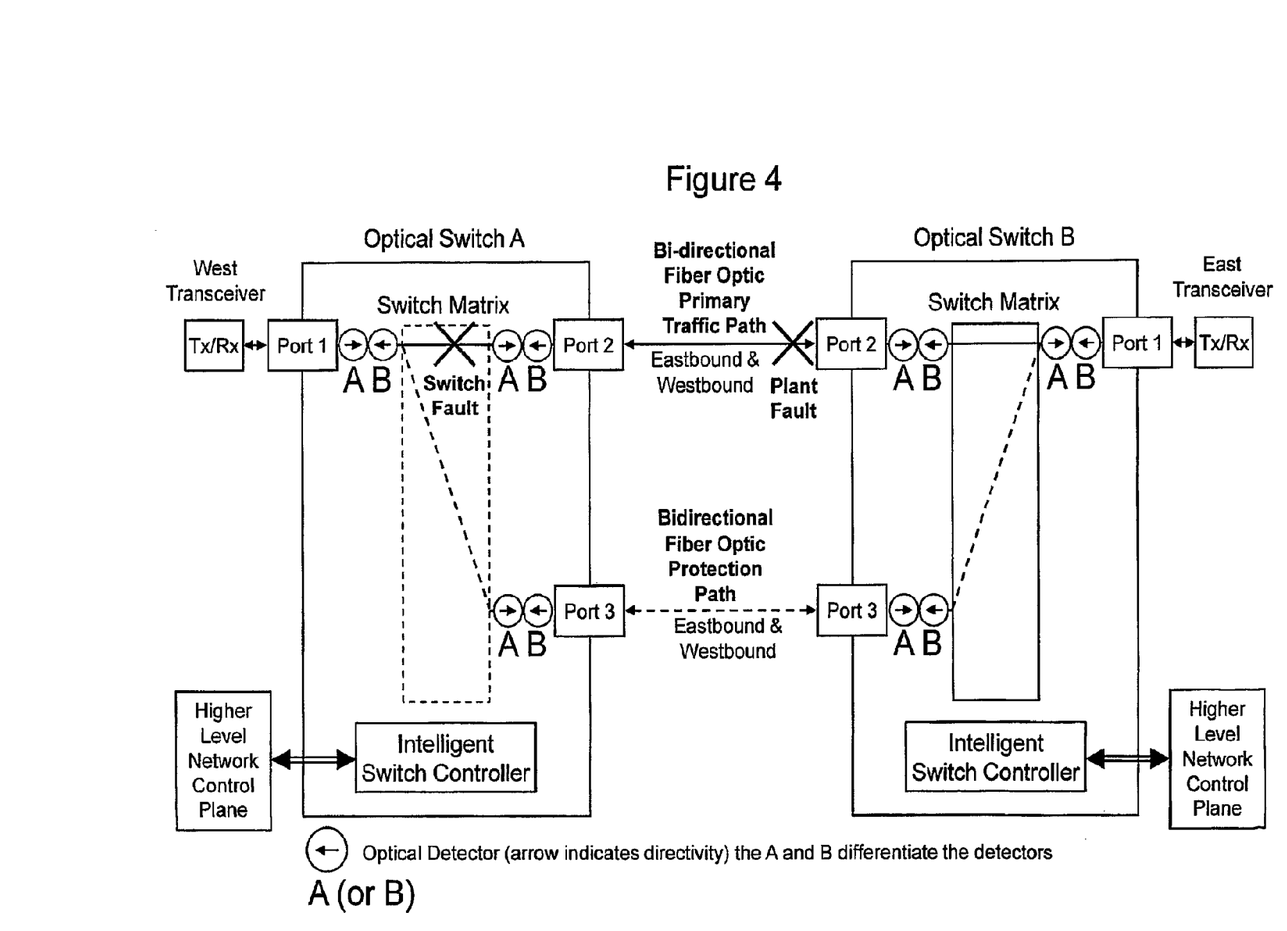
FIG. 4 shows a network protection mechanism for bi-directional fiber systems using switches with two power detectors per switch port.

FIG. 4 shows a network protection mechanism for bi-directional fibre systems with two power detectors per switch port.

In one mode of use when a plant fault occurs on the bi-directional fibre optic primary traffic path signals originating from the east transceiver which are westbound would reflect at the plant fault and be detected in switch B detector A at port 2 as a power level typically associated with reflection. Similarly, westbound signals would be reflected at the break causing a power level typically associated with reflection to be detected at port 2 of switch A by detector B. Furthermore, westbound traffic would be stopped by the break resulting in a drop in power detectable in optical switch A port 2 by detector B. Eastbound signals would also be prevented from reaching optical switch B detector A at port 2 resulting in a loss of power.

Alternatively in a preferred practical embodiment, in the case of plant fault (or degradation) on the fiber path between switch A port 2 and switch B port 2, a comparison of the powers detected in switch A at port 2 detector B and in switch B at port 2 detector A allows the plant fault to be detected.

Furthermore, if a switch fault exists for example between port 1 and port 2 of optical switch A, westbound signals would be reflected and therefore detectable at detector A of port 2 in optical switch A. Similarly, a drop in power would be detected at detector B of port 1 in switch A.

With regards to eastbound signals detector B of port 1 in switch A would detect the reflection due to the break in an optical switch path between port 1 and port 2 whilst detector A of port 2 would detect a loss of power.

Alternatively in a preferred practical embodiment, in the case of switch fault between switch A port 1 and switch A port 2, the detector A at port 1 would see the power of the west transmitter whilst port 2 detector A would read no power or reduced power (or some power loss greater than expected in normal switch operation). The intelligent switch controller would carry out the power comparison and switch matrix fault detection.

In the cases of a switch fault or a plant fault having been identified in this manner, the respective intelligent switch controllers of switch A and switch B cause port 1 to be re-directed to port 3 in both switches.

Thereafter the system awaits a pre-determined amount of time for switch A and B to finish switching. Once the switch is completed, the intelligent switch controllers receive information from detectors A and B of port 3 to confirm that the switching operation has been successful and then informs the higher level network control plane of the change of switch configuration.

If the faults are detected by the detectors of ports 3 then the intelligent switch controller selects the next available protection path.

Furthermore, if a loss of power is detected by detector A of port 1 in switch A, a fault in the west transceiver is detected. Similarly, if a loss of power in detector B of switch B port 1 an east transceiver fault is detected.

Embodiments of the invention can be applied to the difficult task of protection against multiple network faults. This is done by monitored the protection paths the same way as the primary traffic path after a protection path is provisioned and allowing the protection paths to use the same pool of spare fiber paths. The traffic automatically switches to another protection path in the pool if a subsequent fiber failure occurs in the protection path. This feature can greatly enhance overall network reliability and availability.

This allows for efficient use of protection fibers because the local switching control allows the working fiber paths to share a multiplicity of protection fiber paths based on predetermined criteria. The exact protection path does not need to be predetermined before a fiber fault occurs. The mechanism simply selects the next available fiber path out of each node path based on a predetermined hierarchy. Because the local protection switch knows which protection paths are in use at any time it simply selects the next available path and can report when all the protection paths are in use to the higher network control layers. Information on the state of the protection switching can be relayed by the switching element to the higher level network control plans and protection switching criteria can be downloaded from higher level network control layers.

The exact protection fiber used for a particular working fiber failure does not need to be predetermined. The method of how to select the next available protection path can be determined by a variety of means. For example, one simple method would be to pre-provision protection paths and then pre-determine the order they will be assigned to mitigate network faults. This allows multiple working paths connected to the switch to efficiently share a common pool of protection fibers and paths.

Figure 5:
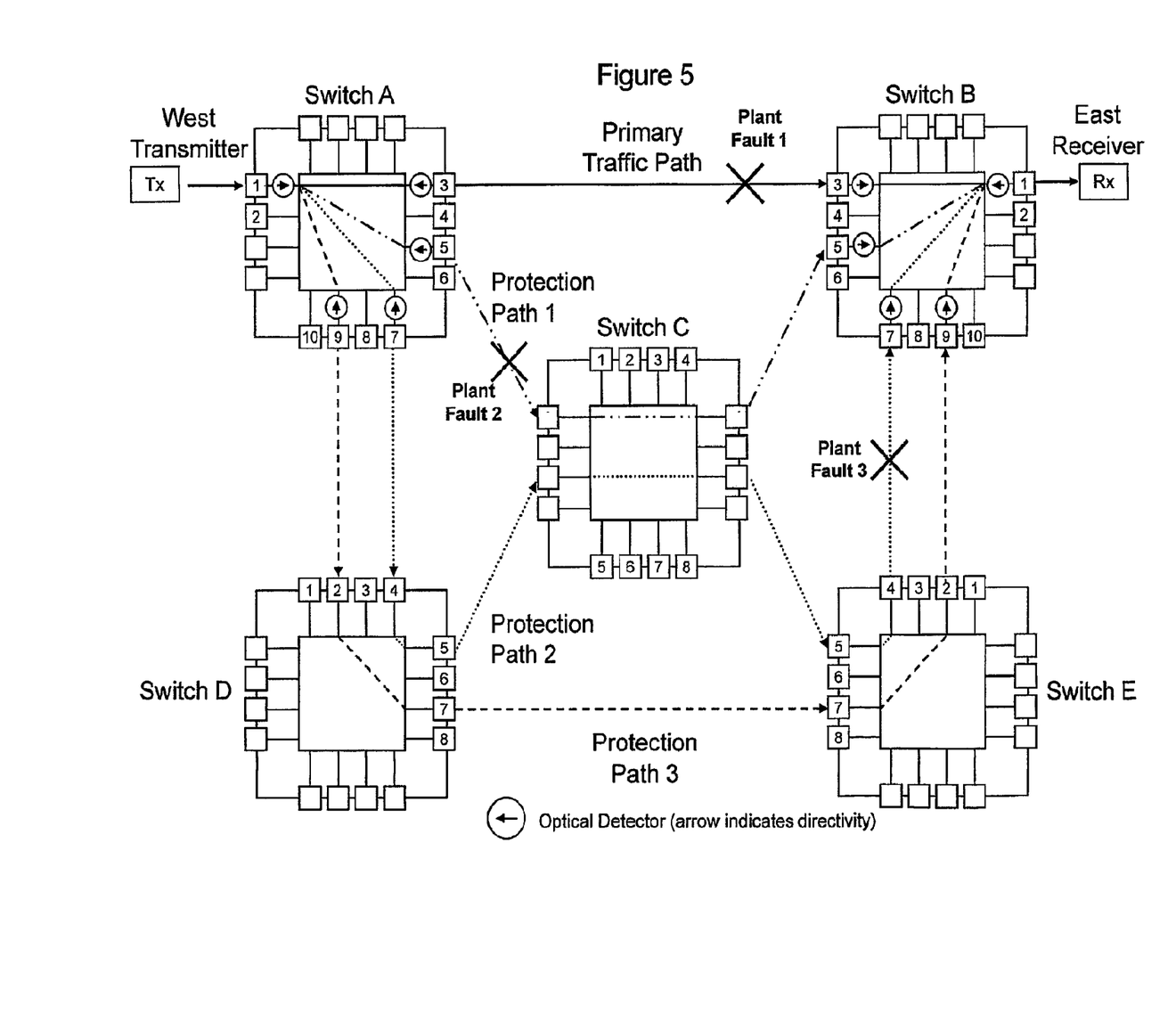
FIG. 5 shows a network protection mechanism for detecting and protecting against a plurality of faults.

FIG. 5 illustrates an embodiment of the detection of multiple fiber faults in a network.

When fault 1 occurs, switch A detects at port 3 a reflection power signal whilst switch B detects a loss of power at the detector of port 3. The respective intelligent switch controllers of switch A and switch B redirect the signals onto protection path 1 towards output port 5 at switch A and input port 5 at switch B. Protection path 1 passes from switch A via switch C to switch B.

When a fault 2 occurs between switch A and switch C, a loss of power is detected at port 5 of switch B and a reflection at port 5 of switch A. The intelligent switch controllers then switch to protection path 2 which passes via port 7 of switch A, switch D, switch C, switch E and then port 7 of switch B.

When a fault 3 occurs between switch E and switch B, a loss of power is detected at port 7 switch B and a reflection is detected at port 7 switch A. The intelligent switch controllers then switch to protection path 3 which passes via port 9 of switch A, switch D, switch E and port 9 of switch B. If no reflection is detected at port 9 of switch A and a typical power signal is detected at port 9 of switch B, the switching operation has been successful despite the occurrence of multiple faults.

The invention claimed is:

1. A network protection switching mechanism comprising:
   a plurality of optical switches located at a plurality of nodes;
   a plurality of optical communication paths between said switches;
   switch based fault detectors located as part of at least two switches which generate detection results representative of the identification of a fault;
   at least one of said fault detectors being based at a first one of said optical switches and configured to detect one of reflection and a loss of power caused by a fault between the first switch and a second one of said optical switches;
   at least a further of said fault detectors being based at said second switch and configured to detect one of reflection and a loss of power caused by a fault between the first and second switches;
   first and second switch based controllers located as part of said first and second switches; and
   internal switch communication means between said fault detectors and said controllers which facilitate the transmission of detection results from said first and second fault detectors to corresponding first and second controllers;
   wherein said first and second controllers directly cause switching to an alternative optical communication path dependent upon the receipt of said detection results; whereby autonomous switch based protection without dependence on either inter-switch control communication or higher level network control communication is achieved; and
   wherein at least one of said controllers is configured to identify available paths to act as alternative optical communication paths; and said at least one controller is configured to directly instruct switching to an identified available path in response to the receipt of said fault results.

2. The network protection switching mechanism according to claim 1, further comprising:
   a plurality of protection paths; and
   at least one further fault detector corresponding to at least one protection path;
   wherein said controller is configured to directly instruct switching to a further protection path in response to the receipt of a fault result from said at least one fault detector.

3. The network protection switching mechanism according to claim 2, wherein said controller is configured to switch to a further protection path in a pre-determined order.

4. The network protection switching mechanism according to claim 3, wherein said fault detectors detect optical power of an optical signal at optical switches coupled via optical communication paths.

5. The network protection switching mechanism according to claim 2, wherein said fault detectors detect optical power of an optical signal at optical switches coupled via optical communication paths.

6. The network protection switching mechanism according to claim 1, wherein said fault detectors detect optical power of an optical signal at optical switches coupled via optical communication paths.

7. A network protection switching mechanism comprising:
   a plurality of optical switches located at a plurality of nodes;
   a plurality of optical communication paths between said switches;
   switch based fault detectors located as part of at least two switches which generate detection results representative of the identification of a fault;
   at least one of said fault detectors being based at a first one of said optical switches and configured to detect one of reflection and a loss of power caused by a fault between the first switch and a second one of said optical switches;
   at least a further of said fault detectors being based at said second switch and configured to detect one of reflection and a loss of power caused by a fault between the first and second switches;
   first and second switch based controllers located as part of said first and second switches;
   internal switch communication means between said fault detectors and said controllers which facilitate the transmission of detection results from said first and second fault detectors to corresponding first and second controllers;
   a plurality of protection paths; and
   at least one further fault detector corresponding to at least one protection path;
   wherein at least one of said controllers is configured to directly instruct switching to a further protection path in response to the receipt of a fault result from said at least one fault detector; and
   wherein said first and second controllers directly cause switching to an alternative optical communication path dependent upon the receipt of said detection results; whereby autonomous switch based protection without dependence on either inter-switch control communication or higher level network control communication is achieved.

8. The network protection switching mechanism according to claim 7, wherein said controller is configured to switch to a further protection path in a pre-determined order.

9. The network protection switching mechanism according to claim 8, wherein said fault detectors detect optical power of an optical signal at optical switches coupled via optical communication paths.

10. The network protection switching mechanism according to claim 7, wherein said fault detectors detect optical power of an optical signal at optical switches coupled via optical communication paths.

11. A method of network protection comprising:
    detecting faults in optical signals at at least two optical switches coupled via optical communication paths, said faults being detected:
       by providing at least one fault detector based at a first one of said optical switches and configured to detect one of reflection and a loss of power caused by a fault between the first switch and a second one of said optical switches; and
       by providing at least a further fault detector based at the second switch and configured to detect one of reflection and a loss of power caused by a fault between the first and second switches;
    generating detection results representative of the identification of a fault;
    communicating said detection results internally within said switches to the respective switch based controller; and directly causing switching to an alternative optical communication path dependent upon the receipt of said detection results; whereby autonomous switch based protection without dependence on either inter-switch control communication or higher level network control communication is achieved;

identifying available paths to act as alternative optical communication paths; and causing said controller to directly instruct switching to an identified available path in response to the receipt of said fault results.

12. The method according to claim 11, further comprising the step of detecting faults on at least one protection path and directly instructing switching to a further protection path in response to the receipt of a fault result from said detection.

13. The method according to claim 12, wherein said detection is a detection of optical power of an optical signal at optical switches coupled via optical communication paths.

14. The method according to claim 11, wherein said detection is a detection of optical power of an optical signal at optical switches coupled via optical communication paths.

15. The method according to claim 11, wherein said detection is a detection of optical power of an optical signal at optical switches coupled via optical communication paths.

16. A method of network protection comprising:

detecting faults in optical signals at at least two optical switches coupled via optical communication paths, said faults being detected:

by providing at least one fault detector based at a first one of said optical switches and configured to detect one of reflection and a loss of power caused by a fault between the first switch and a second one of said optical switches; and by providing at least a further fault detector based at the second switch and configured to detect one of reflection and a loss of power caused by a fault between the first and second switches;

generating detection results representative of the identification of a fault;

communicating said detection results internally within said switches to the respective switch based controller; and directly causing switching to an alternative optical communication path dependent upon the receipt of said detection results; whereby autonomous switch based protection without dependence on either inter-switch control communication or higher level network control communication is achieved;

detecting faults on at least one protection path; and directly instructing switching to a further protection path in response to the receipt of a fault result from said detection.

17. The method according to claim 16, wherein said detection is a detection of optical power of an optical signal at optical switches coupled via optical communication paths.

* * * * *

UNITED STATES PATENT AND TRADEMARK OFFICE
CERTIFICATE OF CORRECTION

PATENT NO.         : 8,358,929 B2                                                    Page 1 of 1
APPLICATION NO.    : 12/301208
DATED              : January 22, 2013
INVENTOR(S)        : Lewis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this
First Day of September, 2015

Michelle K. Lee
*Director of the United States Patent and Trademark Office*